(12) United States Patent
Clifford

(10) Patent No.: US 6,546,694 B2
(45) Date of Patent: Apr. 15, 2003

(54) LIGHT-WEIGHT STRUCTURAL PANEL

(75) Inventor: David D'Arcy Clifford, Caledonia (CA)

(73) Assignee: Dofasco Inc., Hamilton (CA)

( * ) Notice: Subject to any disclaimer, the term of this patent is extended or adjusted under 35 U.S.C. 154(b) by 0 days.

(21) Appl. No.: 09/841,339

(22) Filed: Apr. 24, 2001

(65) Prior Publication Data

US 2002/0152716 A1 Oct. 24, 2002

(51) Int. Cl.[7] .............................. E04C 2/26; B32B 3/10; B32B 15/08
(52) U.S. Cl. ..................... 52/791.1; 52/796.1; 428/138; 428/458; 428/464
(58) Field of Search ............................ 52/796.1, 783.1, 52/791.1; 428/131, 137, 138, 458, 464

(56) References Cited

U.S. PATENT DOCUMENTS

| | | | | |
|---|---|---|---|---|
| 4,039,353 A | * | 8/1977 | Kulick et al. ............... | 148/257 |
| 4,056,878 A | * | 11/1977 | Woodley .................. | 52/787.12 |
| 4,180,406 A | * | 12/1979 | Miyazaki et al. ........ | 106/14.15 |
| 4,405,380 A | * | 9/1983 | Griffith et al. .............. | 148/546 |
| 4,517,028 A | * | 5/1985 | Lindert ........................ | 148/251 |
| 5,124,186 A | * | 6/1992 | Wycech ..................... | 428/35.8 |
| 5,657,603 A | * | 8/1997 | Goodhart et al. ............. | 52/519 |
| 5,985,457 A | * | 11/1999 | Clifford ....................... | 428/416 |
| 6,177,201 B1 | * | 1/2001 | Wallace et al. ............. | 428/472 |

* cited by examiner

*Primary Examiner*—Michael Safavi
(74) *Attorney, Agent, or Firm*—Omar A. Nassif

(57) ABSTRACT

A structural panel comprises a metal and fibrous composite in which the metal outer skins have a minimum thickness of 0.005 in. exceeding foils and a maximum thickness of 0.012 in. while the fibrous core ranges between 0.01 in. and 0.05 in. The panel is a stiff, lightweight substitute for thicker metals and may replace light metal sheets such as aluminum with a composite in which the metal skins comprise sheets from heavier metals such as steel. The fibrous core is a web which is adhesively bonded to the metal skins and which has a plurality of weight-reducing openings formed therein to form a structural laminate having comparable strength to steel sheets of greater weight.

34 Claims, 2 Drawing Sheets

10 # LIGHT-WEIGHT STRUCTURAL PANEL

TECHNICAL FIELD

The present invention relates to laminate structural panels and, more specifically, to light-weight laminates having desirable structural characteristics.

BACKGROUND OF THE INVENTION

A number of approaches have been taken to provide improved structural characteristics of panels without substantially increasing weight or materials cost. Composites of steel sheets having a solid polymer core have been used in applications where sound deadening and vibration dampers are required. These composites, however, suffer from a number of drawbacks such as low resistance to denting and a lack of desired stiffness in many applications. In U.S. Pat. No. 5,985,457 entitled STRUCTURAL PANEL WITH KRAFT PAPER CORE BETWEEN METAL SKINS, the entire disclosure of which is incorporated herein by reference, structural panels are disclosed which are laminate structures having metals skins separated by and bonded to an intervening layer of paper. The laminates described therein have high specific stiffness and dent resistance.

In co-pending U.S. patent application Ser. No. 09/342,690, filed Jun. 29, 1999, entitled, CARGO VEHICLE WALL, the entire disclosure of which is incorporated by reference, truck trailers having walls formed of laminates of metal skins and paper are described. The truck walls provide good structural characteristics while still minimizing weight and cost.

In U.S. Pat. No. 6,171,705, entitled, IMPROVED STRUCTURAL PANEL AND METHOD OF MANUFACTURE, the entire disclosure of which is incorporated by reference, various improvements to metal/paper/metal laminates are disclosed, including improved methods of manufacture.

Despite the numerous advantages of the aforementioned metal/paper/metal laminates, the present inventor has identified a need in some applications for a reduced-weight version of the inventive panels, particularly where large-area panels are fabricated. The present invention achieves this goal.

SUMMARY OF THE INVENTION

In one aspect a structural laminate is provided having first and second skins of sheet metal. A fibrous core layer is provided between the sheet metal skins and is bonded to the skins. A plurality of holes are formed in the fibrous layer, each hole having a an area of from about 0.008 square inch to about 0.2 square inch. In one aspect, the fibrous core layer is impregnated with an adhesive resin. In another aspect layers of adhesive are placed between the core material and the skins. The resulting laminate structure is strong and lightweight.

DETAILED DESCRIPTION OF THE PREFERRED EMBODIMENT OF THE INVENTION

Figure 1:
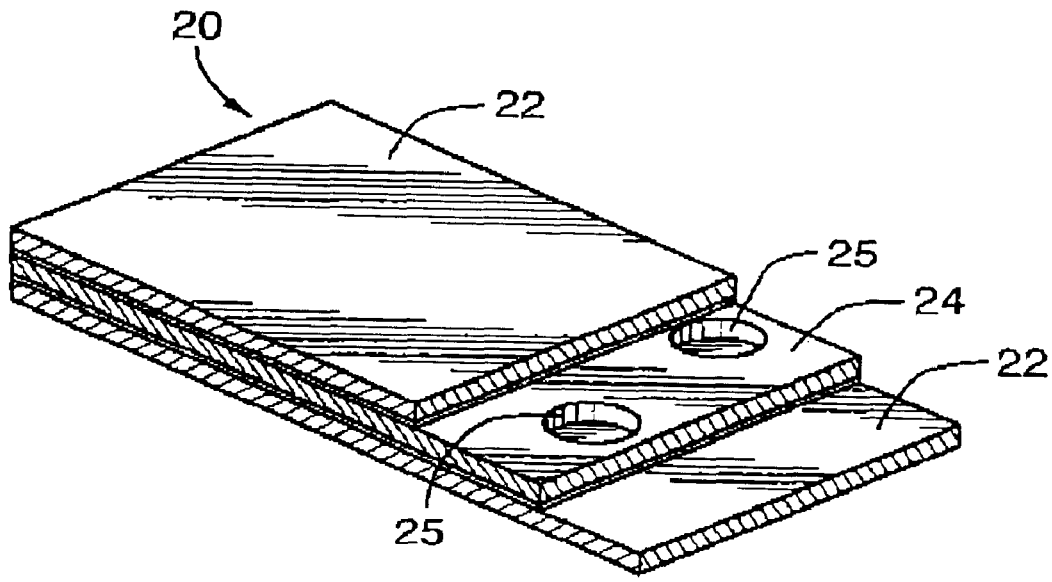
FIG. 1 is a perspective cut-away view of the laminate of the present invention.

Referring now to FIG. 1 of the drawings, panel 20 is shown having metal skins 22 and intervening fibrous layer 24. Layer 24 has a plurality of openings or holes 25.

In one preferred construction, skins 22 are most preferably formed of zinc coated steel, with each layer 22 having a thickness of about 0.005 inch or greater, preferably from between about 0.005 inch and about 0.030 inch and more preferably from about 0.005 inch to about 0.012 inch in thickness. In one embodiment intervening fibrous layer 24 preferably has a thickness of from about 0.01 inch and greater and preferably from about 0.01 inch to about 0.05 inch. Thus, the overall thickness of panel 20 in one embodiment will typically be between about 0.020 inch and about 0.11 inch.

Holes 25 may be formed in most geometric shapes such as circles, squares, triangles and the like. Holes 25 may vary in size and shape in a single layer 24 or may be uniform in size and shape. Preferably each hole 25 will have an area of from about 0.008 square inch to about 0.2 square inch and more preferably from about 0.012 square inch to about 0.11 square inch. The total area of the plurality of holes 25 (the sum of the areas of each hole 25) in layer 24 will depend on a number of factors, including the total area of layer 24. Most preferably, the total area of the plurality of holes 25 will be greater than approximately 10% of the total surface area (principal surface of one side) of layer 24, but generally not more than 50% of the total surface area (principal surface of one side) of layer 24. A panel having the dimensions set forth above in the description of FIG. 1 of the drawings and having the preferred layer thicknesses and area of holes 25 just described will have a weight that is significantly less than the weight of a single sheet of steel of comparable dimensions and stiffness.

The individual layers shown in FIG. 1 will now be described in more detail. As stated, metal skins 22 generally will be flat having planar surfaces on each side. Metals which may be utilized to form skins 22 are preferably selected from the group consisting of steel, aluminum, stainless steel and various combinations thereof. Metals which provide adequate structural and (if required) corrosion resistance properties in the specific environment in which panel 20 is used, at the lowest cost, are most desirable. Most preferable is zinc coated sheet steel.

As will be appreciated by those skilled in the art, steel comes in a number of grades based on the amount of carbon and other elements which it contains. Broadly these grades can be described as low carbon steel, medium steel and high carbon steel. Preferred for use herein are low carbon steel and low carbon micro-alloyed high-strength steel (HSLA). The most preferred metal skins for use in the present invention are cold rolled steel, galvanized steel, tin coated steel, and stainless steel. It may be desirable to utilize single sided galvanized sheet with a galvanized surface comprising the outer surface of skins 22 with the inner surfaces of the skins being bare metal for adhesion purposes. In one embodiment differential zinc coating is preferred, i.e. a light zinc coating on the inside surface and a heavier zinc coating on the outer surface. In one embodiment, zinc coated steel is cold rolled with zinc on the surface to the final thickness.

Layer 24 is a fibrous material. Although not wishing to be bound by any theory, it is believed that the fibrous nature of layer 24 may contribute to the desirable structural characteristics of panel 20, including resistance to delamination. As used herein, the term "fibrous," without limiting its scope in the context of the invention, is intended to mean a generally homogeneous collection of fibers, either natural or synthetic, which can be formed into a sheet product.

Figure 2:
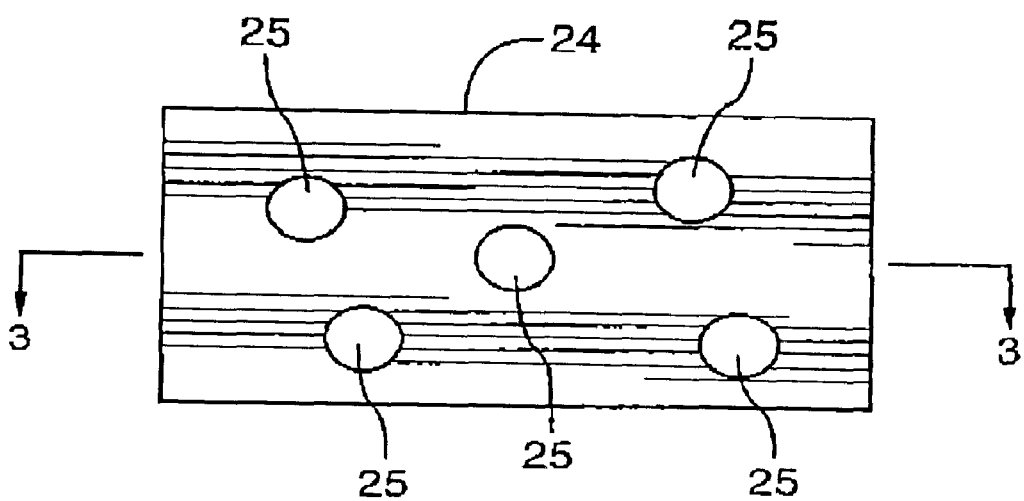
FIG. 2 is a plan view of the paper layer shown in FIG. 1.
Figure 3:
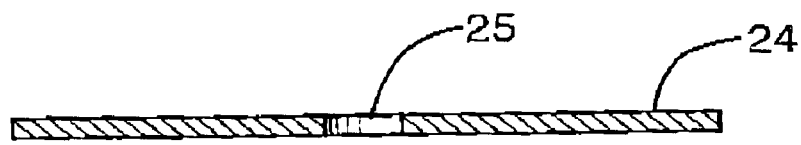
FIG. 3 is a section along lines 3—3 of the paper layer shown in FIG. 2.
Figure 4:
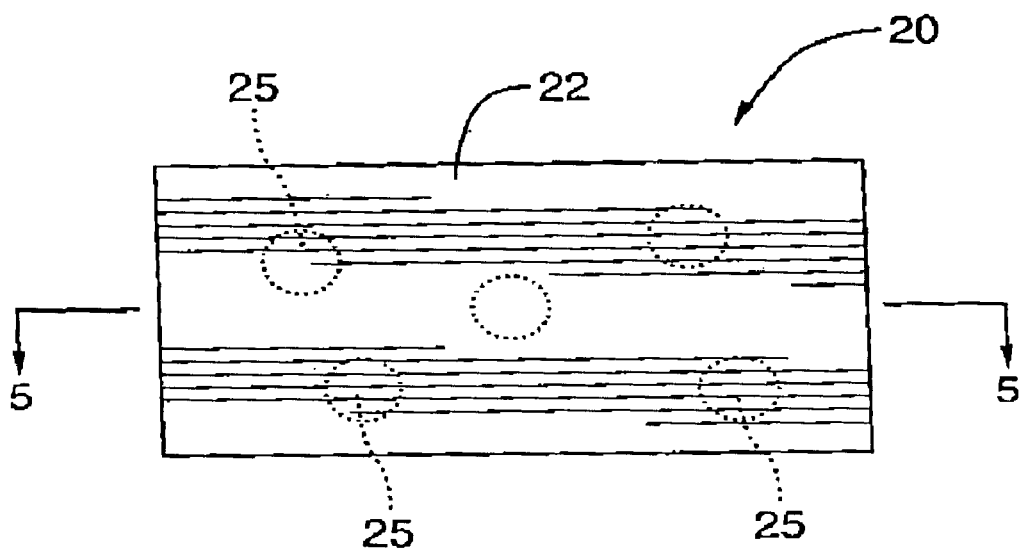
FIG. 4 is a plan view of the panel of FIG. 1 (without cutaway).

Referring now to FIGS. 2, 3 and 4 of the drawings, layer 24 is shown having a plurality of randomly distributed openings or holes 25. Holes 25 may also be distributed in an even array or the like. As stated above, holes 25 may be formed in most geometric shapes and preferably each hole 25 has an area of from about 0.008 square inch to about 0.2 square inch and more preferably from about 0.012 square inch to about 0.11 square inch. Most preferably, the total area of the plurality of holes 25 will be greater than 10% of the total surface area (principal surface of one side) of layer 24, but generally not more than 50% of the total surface area (one side) of layer 24. Holes 25 can be cut with a rule die or may be formed as layer 24 is formed. This construction is particularly suited for forming cargo vehicle panels as described in the foregoing pending U.S. patent application.

The most preferred fibrous material for use herein as layer 24, a material which is believed to be unique among fibrous sheets, is paper. As will be appreciated by those skilled in the art, paper is essentially a matted or felted structure of fibrous material formed into a relatively thin sheet through the medium of a dilute suspension of pulp and water. It is composed essentially of cellulose fibers. Pulp for paper making can be prepared by grinding wood or other plant matter mechanically, by chemical processing (sulfite, kraft, or soda) and also by chemically treating cotton, linen and hemp rags, waste, straw, and the like.

In the present invention, paper formed using the kraft process is most preferred. It will be appreciated by those skilled in the art that the kraft process (which may also be referred to as sulphate pulping or alkaline process) results in papers of high physical strength and bulk. One preferred paper is sold as saturating kraft paper, by Westvaco, of Charleston, S.C.

Also, as will be appreciated by those skilled in the art, the average alignment of cellulose fibers in paper is controlled somewhat by the "machine direction" during production of the paper. It is believed that in the present invention the orientation of the paper in the laminates is a factor which may affect the stiffness and strength of the laminate. Preferred are laminates where the machine direction of the kraft paper is a line parallel to a neutral axis of bending of the laminate.

Another class of fibrous materials for use herein is plastic-fiber paper. Unlike paper, plastic-fiber paper is a collection of synthetic (i.e., synthetic polymer) fibers formed into a sheet. For example, it can be made from 100 percent high-density polyethylene fibers by spinning very fine fibers and then bonding them together with heat and pressure. Nylon paper, such as Nomex type 410, is produced from short fibers (floc) and smaller binder particles (fibrids) of a high-temperature-resistant polyamide polymer, formed into a sheet product.

In one preferred embodiment of the invention, layer 24 is provided as a resin-impregnated, cellulosic paper. Most preferably, the paper is saturated with a resin which is then dried. Most preferred for use herein is phenolic resin-impregnated kraft paper. Polyester resin impregnation may also be suitable in some applications. Methods of impregnating paper with resin will be well-known to those skilled in the art. In essence, the preferred resin-impregnated paper is formed by immersing a substrate paper web in liquid phenolic resin. Typically, layers of saturated impregnated paper are layered together to form a single layer of semi-cured impregnated paper. Methods of impregnation include dipping layer 24 in a bath of resin or coating and spreading the resin on the paper. Although it may be suitable or desirable in specific applications to go beyond the ranges set forth hereinafter with respect to the resin content layer 24, in a preferred embodiment of the present invention resin constitutes from about 15% to about 45% by weight of resin-impregnated layer 24. Holes 25 are substantially free of resin from the impregnation process; that is, holes 25 are not filled with resin during the impregnation process.

In most instances thermosetting resins are preferred for use in impregnating paper layer 24, although in some applications thermoplastic resins may be acceptable. In the case of thermosetting resins, as stated the resin will generally be cured to B-stage prior to forming panel 20, but it may be possible to fully cure the impregnated paper prior to the laminate pressing operation (controlled heat and pressure) described below. In the case of a phenolic resin, the resin is cured to B-stage prior to lamination. It is then fully cured as skins 22 and impregnated paper core 24 are laminated together using the press. It may be suitable in some applications to include a number of standard additives in the resin such as curing agents, fillers and the like.

Figure 5:
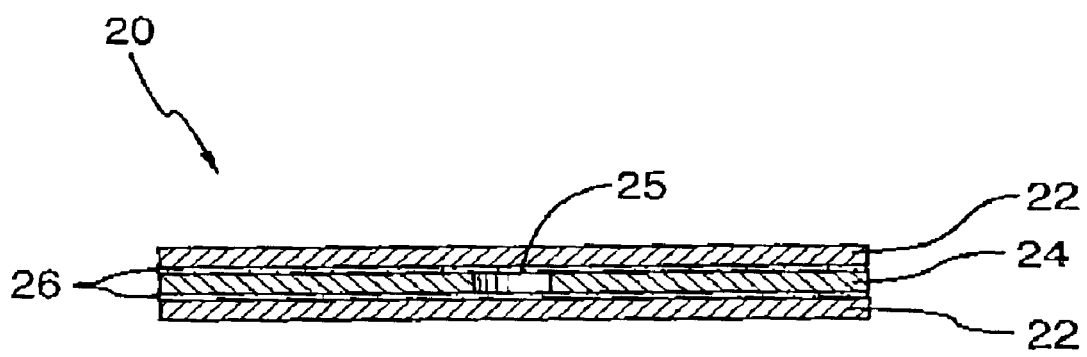
FIG. 5 is a section of the panel shown in FIG. 4 along lines 5—5.

Referring now to FIG. 5 of the drawings (with or without resin impregnation of fibrous layer 24), it may be desirable in some applications to use adhesive layers 26 to bond skins 22 to fibrous core 24. A number of adhesives may be suitable in specific applications, including epoxies, phenolics, isocyanates, polyurethanes, and hot-melts. A particularly preferred adhesive for this purpose is a nitrile phenolic sold as "Arofene 1166" from Ashland Chemical. The adhesive may be applied directly to layer 24 or to metal skins 22 or both by any number of methods. Again, holes 25 are not filled with resin. It is preferred to pretreat the steel with a conversion coating such as a complex oxide or zinc phosphate to improve bond integrity and corrosion resistance.

One method of forming composite panel 20 is through the use of a heated press (not shown). After a number of metal/fiber/metal laminates are stacked (preferably from 5–20), the press closes to apply pressure to the stack. The times, temperatures and pressures will vary widely depending upon thicknesses of skins 22 and layers 24, types of resin used to impregnate the central layer, and the type of adhesive used, if any, between the central layer and the metal skins. Most preferably, the temperature used should be adequate to cure the phenolic resin fully and assure bonding of the adhesive layers, if any. After the pressed stack has cooled, it is removed from the press, individual panels are then separated.

While particular embodiments of this invention are shown and described herein, it will be understood, of course, that the invention is not to be limited thereto since many modifications may be made, particularly by those skilled in this art, in light of this disclosure. It is contemplated, therefore, by the appended claims, to cover any such modifications as fall within the true spirit and scope of this invention.

I claim:

1. A structural laminate comprising:

first and second skins of sheet metal, each of said skins having a thickness of at least about 0.005 in.;

a resin-impregnated fibrous core disposed between said skins of sheet metal;

said fibrous core being bonded to said skins of sheet metal; and said fibrous core having a plurality of holes formed therein, each of said holes: (i) having an area of from about 0.008 square in. to about 0.2 square in.; and (ii) being substantially free of resin.

2. The structural laminate recited in claim 1, wherein said sheet metal is selected from the group consisting of cold rolled steel, galvanized steel, tin-coated steel, aluminum and stainless steel.

3. The structural laminate recited in claim 1, wherein said fibrous core is adhesively bonded to said skins of sheet metal.

4. The structural laminate recited in claim 1, wherein each of said skins has a thickness of from about 0.005 in. to about 0.030 in.

5. The structural laminate recited in claim 1, wherein the fibrous core is impregnated with a thermoplastic resin.

6. The structural laminate recited in claim 1, wherein said fibrous core has a thickness of at least about 0.01 in.

7. The structural laminate recited in claim 1, wherein said fibrous core has a thickness of from about 0.01 in. and 0.05 in.

8. The structural laminate recited in claim 1, wherein said laminate is a structural panel.

9. The structural laminate recited in claim 1, further including layers of adhesive disposed between said fibrous core and each of said skins.

10. The structural laminate recited in claim 1, wherein said fibrous core is paper.

11. The structural laminate recited in claim 1, wherein said fibrous core consists of a plastic-fiber paper comprising a plurality of synthetic polymer fibers formed into a sheet.

12. The structural laminate recited in claim 1, wherein the fibrous core comprises from about 15% to about 45% by weight resin.

13. The structural laminate recited in claim 1, wherein said fibrous core is a plurality of webs of fiber adhesively bonded to each other.

14. The structural laminate recited in claim 1, wherein said metal skins are steel which has been pretreated with a conversion coating to promote bond integrity and corrosion resistance.

15. The structural laminate recited in claim 1, wherein said metal skins are formed of low carbon micro-alloyed high-strength steel.

16. The structural laminate recited in claim 1, wherein the fibrous core has a principal surface and the sum of the areas of the holes is greater than 10% of the area of said principal surface.

17. The structural laminate recited in claim 1, wherein the sum of the areas of the holes is 50% or less of the area of said principal surface.

18. The structural laminate recited in claim 1, wherein each of said skins has a thickness of from about 0.005 in. to about 0.012 in.

19. The structural laminate recited in claim 1, wherein the overall thickness of the structural laminate is in the range of from about 0.020 in. to about 0.11 in.

20. The structural laminate recited in claim 1, wherein the holes are substantially in the shape of a circle.

21. The structural laminate recited in claim 1, wherein the holes are substantially in the shape of a triangle.

22. The structural laminate recited in claim 1, wherein the holes are substantially in the shape of a square.

23. The structural laminate recited in claim 1, wherein the holes vary in size.

24. The structural laminate recited in claim 1, wherein the holes vary in shape.

25. The structural laminate recited in claim 1, wherein the holes have a substantially uniform size and shape.

26. The structural laminate recited in claim 1, wherein each of said holes has an area in the range of from about 0.012 square in. to about 0.11 square in.

27. The structural laminate recited in claim 1, wherein the fibrous core has a principal surface and the sum of the areas of the holes in the range of from about 10% to about 50% of the area of said principal surface.

28. The structural laminate recited in claim 1, wherein each of said skins comprises a planar surface.

29. The structural laminate recited in claim 1, wherein each of said skins comprises a sheet metal having an outer galvanized surface and an inner non-galvanized surface in contact with the fibrous core.

30. The structural laminate recited in claim 1, wherein the holes are randomly distributed through the fibrous core.

31. The structural laminate recited in claim 1, wherein the holes are distributed through the fibrous core in a substantially even array.

32. The structural laminate recited in claim 1, wherein the fibrous core is impregnated with a thermosetting resin.

33. A structural panel comprising:

a first steel skin and a second steel skin, each of the steel skin and the second steel skin having a thickness in the range of from about 0.005 in. to about 0.012 in.;

a fibrous core impregnated with a thermoplastic resin, the core being interposed between and bonded to the first steel skin and the second steel skin;

wherein the core comprises a plurality of apertures formed therein, each aperture: (i) having an area of from about 0.008 square in. to about 0.2 square in.; and (ii) being substantially free of thermoplastic resin which impregnates the core.

34. A cargo vehicle wall comprising:

a first steel skin and a second steel skin, each of the steel skin and the second steel skin having a thickness in the range of from about 0.005 in. to about 0.012 in.;

a fibrous core impregnated with a thermoplastic resin, the core being interposed between and bonded to the first steel skin and the second steel skin;

wherein the core comprises a plurality of voids formed therethrough, each void: (i) having an area adjacent the steel skin of from about 0.008 square in. to about 0.2 square in.; and (ii) being substantially free of thermoplastic resin which impregnates the core.

* * * * *